United States Patent
Reitz et al.

(10) Patent No.: US 8,898,072 B2
(45) Date of Patent: Nov. 25, 2014

(54) OPTIMIZING ELECTRONIC DISPLAY OF ADVERTISING CONTENT

(75) Inventors: James Reitz, San Francisco, CA (US); Paul Deeds, Berkeley, CA (US)

(73) Assignee: HubPages, Inc., San Francisco, CA (US)

( * ) Notice: Subject to any disclaimer, the term of this patent is extended or adjusted under 35 U.S.C. 154(b) by 994 days.

(21) Appl. No.: 11/738,421

(22) Filed: Apr. 20, 2007

(65) Prior Publication Data
US 2008/0262913 A1 Oct. 23, 2008

(51) Int. Cl.
*G06Q 30/00* (2012.01)
*G06Q 30/02* (2012.01)

(52) U.S. Cl.
CPC ............ *G06Q 30/02* (2013.01); *G06Q 30/0236* (2013.01)
USPC ......... 705/14.36; 715/740; 715/743; 715/744

(58) Field of Classification Search
CPC ........... G06F 17/3089; G06Q 30/0243; G06Q 30/0258
USPC ......... 715/740, 744, 743, 773; 705/14.36, 14, 705/36
See application file for complete search history.

(56) References Cited

U.S. PATENT DOCUMENTS

| | | | |
|---|---|---|---|
| 6,829,780 B2 * | 12/2004 | Kraft et al. | 725/42 |
| 6,986,154 B1 * | 1/2006 | Price et al. | 725/46 |
| 7,319,976 B1 * | 1/2008 | Peckover | 705/14.36 |
| 2001/0054001 A1 * | 12/2001 | Robinson | 705/14 |
| 2002/0072966 A1 * | 6/2002 | Eldering et al. | 705/14 |
| 2003/0055725 A1 * | 3/2003 | Lee | 705/14 |
| 2003/0171990 A1 * | 9/2003 | Rao et al. | 705/14 |
| 2003/0208754 A1 * | 11/2003 | Sridhar et al. | 725/34 |
| 2004/0044565 A1 * | 3/2004 | Kumar et al. | 705/14 |
| 2004/0204983 A1 * | 10/2004 | Shen et al. | 705/10 |
| 2004/0243623 A1 * | 12/2004 | Ozer et al. | 707/102 |
| 2004/0267612 A1 * | 12/2004 | Veach | 705/14 |
| 2005/0021397 A1 * | 1/2005 | Cui et al. | 705/14 |
| 2005/0027587 A1 * | 2/2005 | Latona et al. | 705/10 |

(Continued)

OTHER PUBLICATIONS

Slegg, Jennifer; "Making Sense of Contextual Advertising"; Aug. 4, 2005; http://www.jensense.com/archives/2005/08/adsense_will_fl_html; pp. 1-3.

*Primary Examiner* — Stephen Hong
*Assistant Examiner* — Marshon Robinson
(74) *Attorney, Agent, or Firm* — Trellis IP Law Group, PC

(57) ABSTRACT

In one embodiment, a selection process executing in an optimizing engine is invoked as users are presented with web pages that include ad content. The selection process provides an initial population of sets of characteristics that specify an initial generation of layouts of ads for the pages. The characteristics can include anything that affects an ads appearance on the display. For example, ad type, position within a web page, color, size, text font, animation, etc. can be specified. Statistics are obtained as to each ad or page layout's performance or impact on the user, such as revenue obtained from ads in the layout, how many user's click an ad, how long users view an ad, etc. Once a large enough sample of user impacts is obtained a second population of sets of characteristics is created to improve the overall performance of the initial population. In a preferred embodiment, genetic computational procedures are used to create each population and to create new characteristic sets and remove underperforming sets.

16 Claims, 5 Drawing Sheets

(56) References Cited

U.S. PATENT DOCUMENTS

| | | | |
|---|---|---|---|
| 2005/0114198 A1* | 5/2005 | Koningstein et al. | 705/10 |
| 2005/0119934 A1* | 6/2005 | Kamiyama | 705/14 |
| 2005/0197894 A1* | 9/2005 | Fairbanks et al. | 705/14 |
| 2006/0026067 A1* | 2/2006 | Nicholas et al. | 705/14 |
| 2006/0085408 A1* | 4/2006 | Morsa | 707/3 |
| 2006/0149622 A1* | 7/2006 | Baluja et al. | 705/14 |
| 2006/0173743 A1* | 8/2006 | Bollay | 705/14 |
| 2006/0259455 A1* | 11/2006 | Anderson et al. | 707/1 |
| 2007/0027772 A1* | 2/2007 | Chou | 705/14 |
| 2007/0027864 A1* | 2/2007 | Collins et al. | 707/5 |
| 2007/0133034 A1* | 6/2007 | Jindal et al. | 358/1.14 |
| 2007/0192190 A1* | 8/2007 | Granville | 705/14 |
| 2007/0276726 A1* | 11/2007 | DiMatteo | 705/14 |
| 2007/0300152 A1* | 12/2007 | Baugher | 715/522 |
| 2008/0140508 A1* | 6/2008 | Anand et al. | 705/10 |
| 2008/0208786 A1* | 8/2008 | Serrano-Morales et al. | 706/47 |
| 2012/0124619 A1* | 5/2012 | Rowe et al. | 725/32 |

* cited by examiner

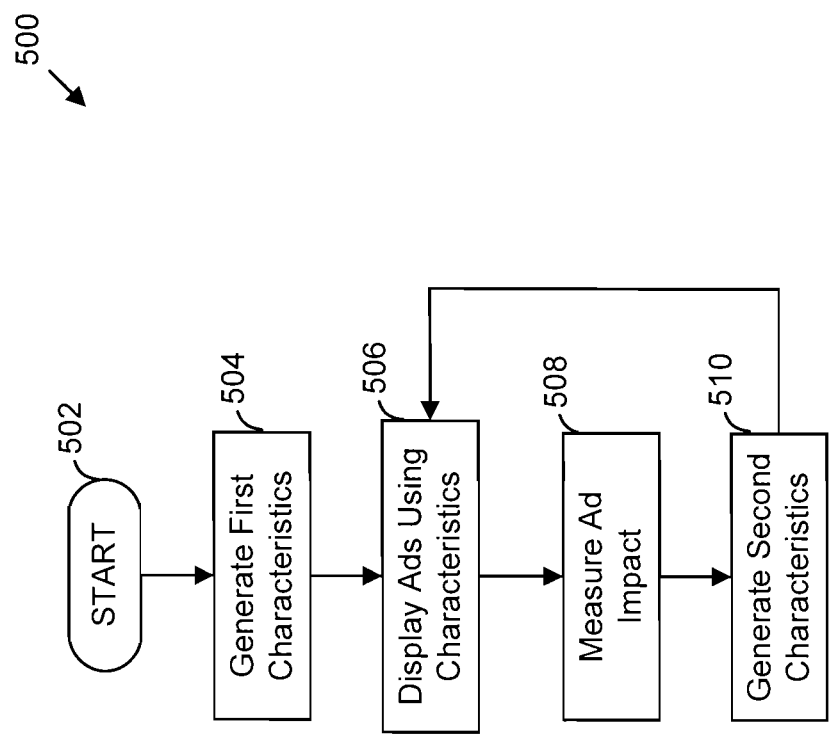

OPTIMIZING ELECTRONIC DISPLAY OF ADVERTISING CONTENT

TECHNICAL FIELD

This disclosure relates in general to electronic display of information and more specifically to a system for optimizing the display of advertising content.

BACKGROUND

Electronic transmission and display of information is prevalent. Forms of electronic displays of information include web pages, electronic mail (email) and attachments, text messages, displaying documents such as text and image documents, spreadsheets, or other forms of files or data. Such information display can take place on many types of devices such as computer systems, billboard displays, cell phones, personal digital assistants (PDAs), email devices, cameras, etc.

Along with displaying main content that is the initial subject of interest to viewers, advertising or other commercial content is often included with the display of the main content. Displaying commercial content is an important revenue source for many providers of the main content, or for providers of other services or equipment that contribute to a user's access to the main content. One approach to providing advertising content includes ads that are adjacent to or embedded with portions of the main content. When the ad is displayed in a web page many of the ad's characteristics (i.e., ad metadata) such as ad type, position within a web page, color, size, text font, animation, etc. become very important to whether a user notices the ad and reads the ad or otherwise reacts to the ad.

Ideally, for the ad's sponsor, the user will click on the ad to be taken to a commercial website to be presented with additional product or service information or, ideally, to complete a sale. Even if the ad is merely noticed by the user, then a psychological attachment to the sponsor's product or service can be achieved which can have significant value to the ad's sponsor.

Although ad characteristics can be important to the ad's impact on a user, it can be difficult to determine the ideal ad characteristics that will achieve the highest impact.

SUMMARY OF EMBODIMENTS OF THE INVENTION

A preferred embodiment of the invention is directed to determining optimal placement and appearance of advertisements in a web page. Other embodiments can be adapted for different types of content delivery and display such as in the body or attachments of an email message, within documents or files, within or adjacent to digital video, movie, Flash™ animations, etc.

A selection process executing in an optimizing engine is invoked as users are presented with web pages that include ad content. The selection process provides an initial population of sets of characteristics that specify an initial generation of layouts of ads for pages. The characteristics can include anything that affects an ads appearance on the display. For example, ad type, position within a web page, color, size, text font, animation, border or other decorative ad features, images within an ad (e.g., internal image size and position), etc. can be specified. Statistics are obtained as to each ad or page layout's performance or impact on the user, such as revenue obtained from ads in the layout, how many user's click an ad, how long users view an ad, etc.

Once a large enough sample of user impacts is obtained a second population of sets of characteristics is created to improve the overall performance of the initial population. In a preferred embodiment, a genetic computational procedure is used to create each population and to create new characteristic sets and remove underperforming sets. In other embodiments, other computing methods can be used for one or more of the functions described herein.

In one embodiment the invention provides a method, for displaying ad content with main content on a display device, wherein the display device is operated by a user, the method comprising: generating first characteristics for the display of the ad content; sending display information to a user device to display the ad content with the main content according to the first characteristics; accepting a user input signal associated with the user device to indicate an impact of the ad content upon a human user; generating second characteristics derived at least in part from the first characteristics and the indicated impact; and sending display information to a user device to display the ad content with the main content according to the second characteristics.

BRIEF DESCRIPTION OF THE DRAWINGS

FIG. 5 is an example flowchart illustrating basic steps in a method

DETAILED DESCRIPTION OF EMBODIMENTS OF THE INVENTION

Figure 1:
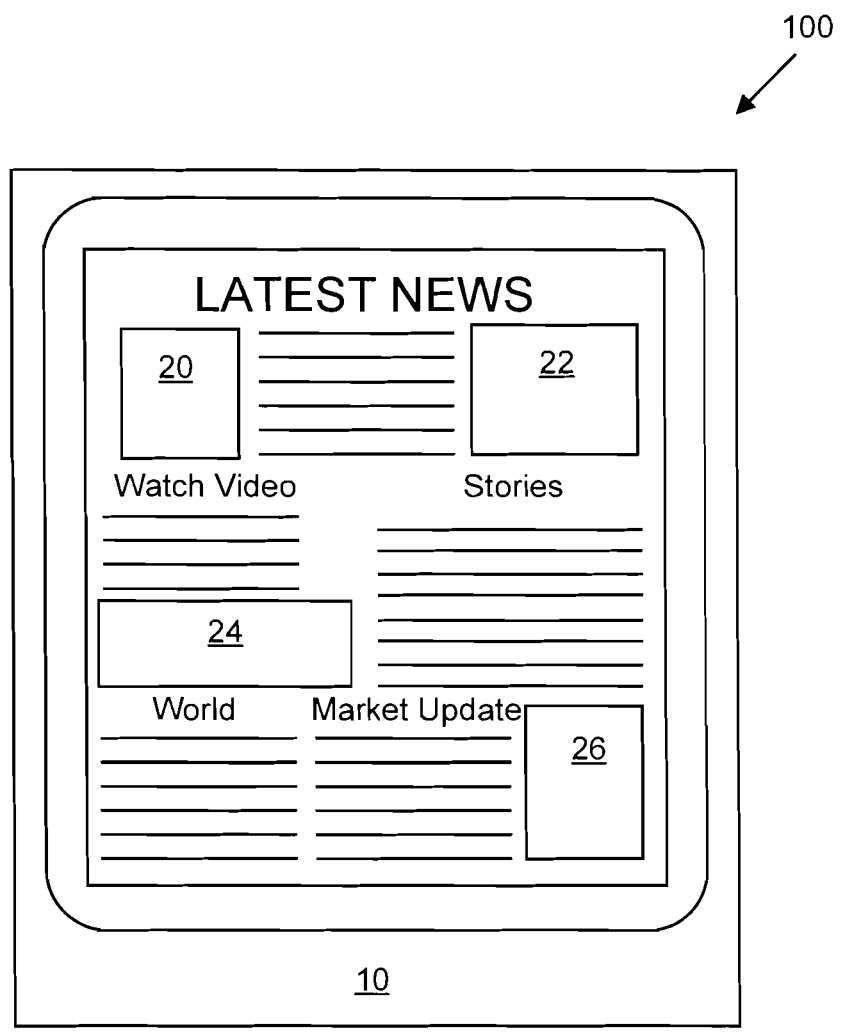
FIG. 1 illustrates a web page layout including main content and ad content.

FIG. 1 illustrates a layout of web page 100. A web page such as web page 100 is typically provided in response to a user selection or signal such as when a user selects or clicks a link, or hyperlink, to the web page. A web browser or other display system or process executing on a device such as a computer is used to display the web page in response to a web page definition that can include text in a standard format such as Hyper Text Markup Language (HTML), Extensible HTML (XHTML), Extensible Markup Language (XML), JavaScript™, etc. Web pages can include various other mechanisms or definitions to assist in the display or presentation of information (e.g., image, sound, executable code, hyperlinks etc.) such as JavaScript™, Dynamic HTML (DHTML), Cascading Style Sheets (CSS), C code, etc. Although a preferred embodiment is described with reference to web pages any suitable system, format or approach to display electronic information may be used.

Web page 100 would typically be displayed on a display screen such as display screen 10. All or a portion of the web page might be displayed at any one time. Multiple web pages and/or other types of electronic information can also be displayed on one screen. The web page includes advertising content that can be positioned at slots such as ad slots 20, 22, 24 and 26. Other content on the page such as text and images is referred to as "main content" since it is usually the content that is of primary or initial interest to a user who has selected the page. Note that any type of content may be used with features of the present invention. It should be apparent that FIG. 1 is only an example of a single layout for purposes of discussion and the layout of other pages can vary widely.

For example, the size, shape, number and position of the ad slots can vary. The type and arrangement of the main content can change. A page may have one or more ad slots and may have no content other than ad content, if desired. Animations can be used in the ad and main content. Other mechanisms such as hyperlinks, digital video, color, font, etc. can be used as is known in the art.

In a preferred embodiment, ad slots 20, 22, 24 and 26 are areas of the page that can be filled with ad content at or before a time when a user requests the page, or the page is otherwise provided to a device for display. Ad content is defined to be displayed in one or more of the slots according to ad metadata or characteristics such as ad type, color, size, position, etc. An ad may occupy all or a fraction of an ad slot or the slot may be left empty or hidden. Position of the ad can include the slot to which an ad is assigned and the ad's position within the slot. In other embodiments, ad position on a page does not have to be handled with slots but can be by any other positioning scheme. For example, ad x,y coordinates with respect to a position on the page can be used. Or ad slot information may be an approximation of where an ad will be placed rather than a mandatory region. In some approaches, ads are allowed to move or float over the main content. Other approaches are possible.

Figure 2:
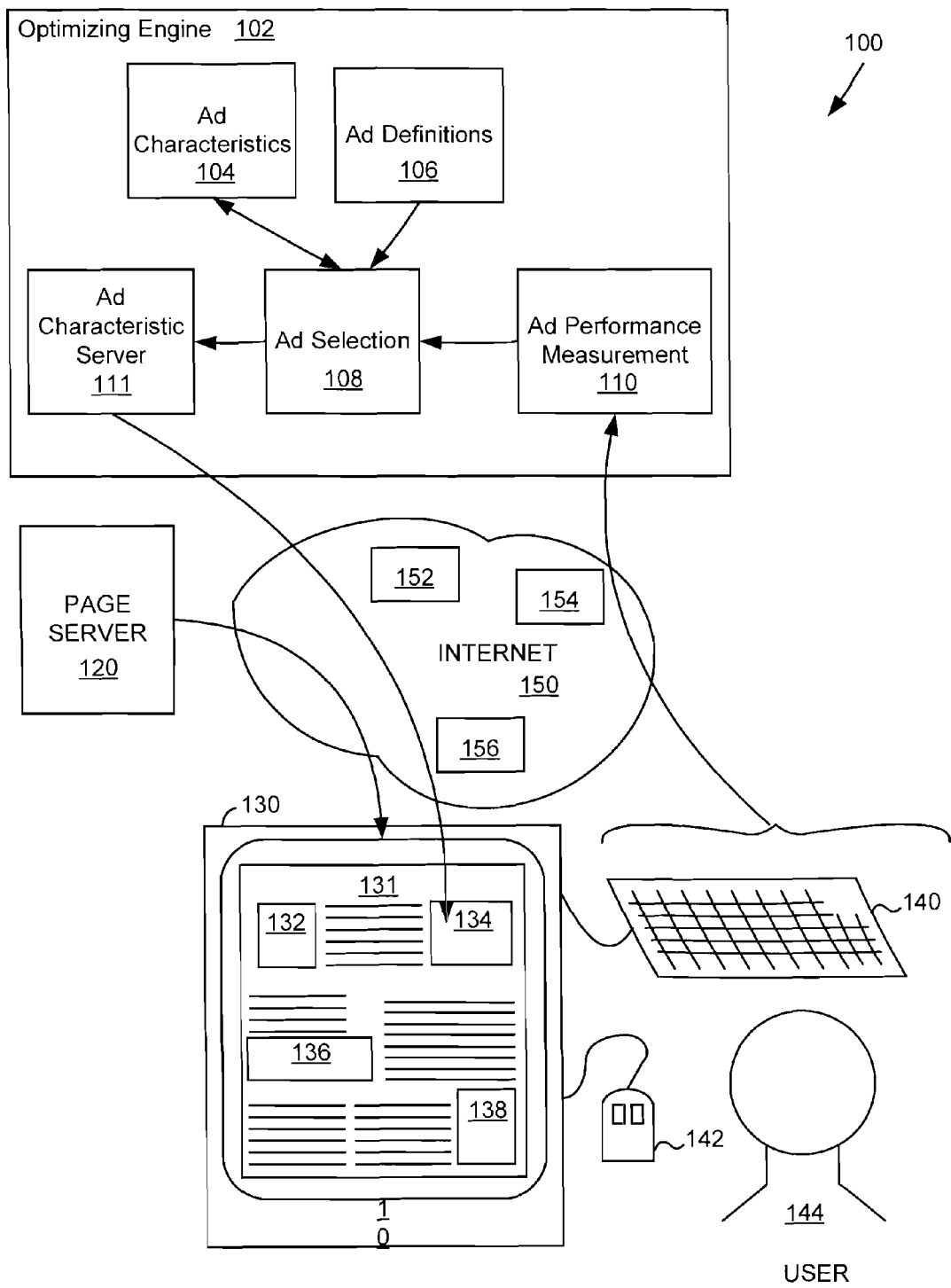
FIG. 2 shows basic components of a system for practicing an embodiment of the invention over a digital network such as the Internet.

FIG. 2 illustrates basic components of a system for practicing an embodiment of the invention in a digital network such as the Internet. System 100 includes an optimizing engine 102 for generating web page layouts using different ad characteristics. Optimizing engine 102 includes stored ad characteristics 104, ad content definitions 106, ad selection process 108, ad characteristic server 111 and ad performance measurement 110. Note that the diagram of FIG. 2 is but one example of an arrangement of components in a system suitable for use with the invention. Many variations are possible including adding, deleting or modifying components, data paths or other aspects of the example system.

User 144 operates a computer system that includes display screen 130 and user input devices such as keyboard 140 and mouse 142. Although specific devices are shown, many other types of devices can be used. For example, user input devices can be any suitable type of device such as a trackball, touch screen, motion or gesture detection, image or voice recognition, etc. Other basic components that may be used in a computer system are not specifically shown. For example, a processor, memory, hard disk drive, input/output ports and connectors, etc. are not shown but it should be apparent that such devices or hardware are used, as needed. Yet other types of devices such as portable computers, PDAs, cell phones, portable email devices, audio players, etc. can be used in place of the computer system of FIG. 2. In general, any suitable type of device having an associated display and user input device can be employed.

User 144 operates the computer system to cause a display of a web page such as web page 131. Page server 120 provides web page 131 to the user's computer system or other user device via Internet 150. Web page 131 includes text and/or images that are the main content of the page and also includes ad content such as ads 132, 134, 136 and 138. In one embodiment the placement of ads within a page is determined by the presence within the page definition of calls to an ad server such as optimizing engine 102. The calls are text or script placed within the page definition manually or automatically to determine the spaces that an ad might occupy. For example, a call can be placed by a human web page author when the page definition is created. Or the call can be inserted by page server 120 or a different device or process when the page is created, or dynamically when the page is formed in real time in response to a user or device requesting the page. Calls can be placed in any other suitable way such as with a combination of manual and automated techniques.

One or more of the calls results in a communication to ad selection process 108 of optimizing engine 102. Ad selection process 108 determines the ad content and characteristic to be used to display the ad. Ad content is retrieved from ad definitions 106 and ad characteristics are obtained from ad characteristics 104. The ad content and characteristics are provided to the web browser executing in the user's computer system by ad selection process 108 and ad characteristics server 111, respectively, to generate the display of web page 131. The displayed page shows the ads embedded within the page and interspersed at different positions within the main content of the page. In a preferred embodiment the characteristics are communicated via serialized JavaScript™ (JSON) but other embodiments can use XML, or any other suitable mechanism.

Note that many variations to this approach are possible. For example, some types of page definitions may allow the ads to be placed on the page arbitrarily at a time of serving the page. In other words, no predetermined positions for the ads need to be coded into an original page definition and the call functions can be achieved by other mechanisms. This would allow the optimizing engine to have more control over ad position in a page as opposed to using set calls at predetermined positions. It is also possible to have ad content and/or ad characteristics reside at a site that is remote from, and not part of, optimizing engine 102. So, for example, the ad content can be obtained from a different (i.e., third-party) server or site that is run by a person, company or other entity distinct from the entity operating the optimizing engine and distinct from the user. The ad content can still be displayed according to the ad characteristics which can come from the entity operating the optimizing engine, the entity operating hosting the ad definitions, or from a different entity. Each of these pieces of the ad display information can be conveyed to the user device over a digital network such as Internet 150. As is known in the art, Internet 150 is an open network system that includes many other devices such as routers, switches, servers, etc. These are shown symbolically by components 152, 154 and 156. The transfer of information via the Internet can use any suitable type and number of devices and processes and can use with any suitable data format, protocol, standard or other present or future convention or characteristic.

Yet another approach can allow optimizing engine 102 to provide the entire web page definition to a user including ad content. In this approach it is not necessary to have separate calls for ad content since the page's main content and ad content are formed or hosted at a single site. Alternatively, calls can be included to other sites to obtain parts of the ad content to be used for one or more ads. In general, the functions described herein can be performed by the same or different devices and/or processes at one or more places and times. For example, although the optimizing engine and its components are described as being remote from the user device and communicating over the Internet, other embodiments can allow one or more of the optimizing engine components (or a portion of the components' functionalities) to operate locally with, or on, the user device.

User 144's actions with respect to the page are monitored and information that could indicate an ad's "impact" on the user (i.e., the ad's "performance") is provided to ad performance measurement process 110. For example, the act of a user clicking on an ad or on text or images within, adjacent to or otherwise associated with an ad can be a factor used in ad performance measurement process 110. A preferred embodiment uses actual sales or revenue obtained from ads so user completions of a transaction initiated with an ad are tracked. Other acts such as a user moving a pointer over an ad (so-called "mouse over"), the duration of time the ad remains visible on the display, or other types of detected user actions or inactions can be indicated and used by ad performance measurement process 110 to help determine a performance level for the ad. In the preferred embodiment, some of these measurements are gathered via JavaScript™ and communicated back to process 110 over the Internet. This communication happens transparently to the user via XMLHTTP requests or as parameters in a hidden image, etc as is known in the art.

The performance measurements are provided to ad selection process 108 in order to rank each set of characteristics used by an ad so that sets that result in better ad performance are used more often and sets that result in worse ad performance are used less often. The ad performance can be weighted with the average or actual revenue associated with the data gathered in process 110. Thus, over time the performance of the ads are improved.

Figure 3:
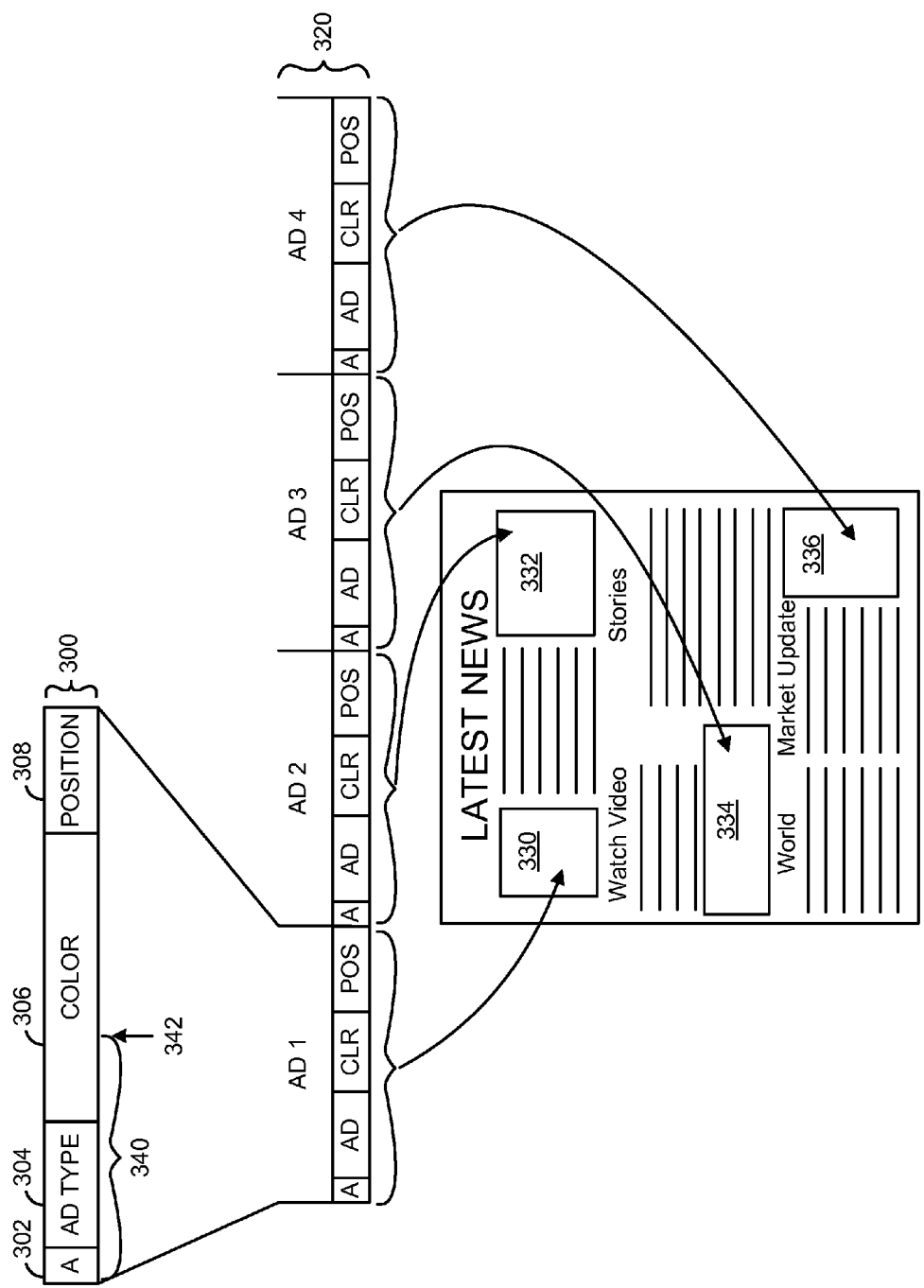
FIG. 3 shows an example format for an ad characteristic definition.

A particular embodiment focuses on the effectiveness of an overall page layout of one or more ads. Genetic computational procedure techniques are used so that a population of layouts changes from generation to generation based on performance, or "fitness," of particular characteristics used in the layout. A layout is expressed in digital form as "chromosomes", "genotype", "genome" or "agent". As performance results are obtained, better performing agents are used to generate hybrid agents for the next population FIG. 3 shows an example format for an ad characteristic definition 300. Ad characteristic definition 300 includes Active Indicator 302 data for whether the agent is currently enabled or not. Ad type 304 is a pointer to the actual ad content data (e.g., the ad's visual image definition) which can reside at a different server or computer system from the computer system executing the optimizing engine. Color Field 306 indicates one or more colors to be used in displaying the ad. For example, the color of a background upon which the ad content is displayed can be specified along with other color properties such as text and border colors, different colors for different fonts, hyperlink text, etc. Position Field 308 determines where within an ad slot the ad content corresponding to the Ad Type is displayed. This allows more precise control of ad positioning within a page layout.

Each ad characteristic definition defines how an ad is displayed within an ad slot in a page layout. One or more ad characteristic definitions are combined to form the agent or genome for a layout that corresponds to a particular page of main content. Agent 320 includes ad characteristic definitions for 4 ads named Ad 1, Ad 2, Ad 3 and Ad 4. Ad characteristic definition 300 has been reduced in size for purposes of illustration to be Ad 1's characteristic within agent 320.

Each ad characteristic in the set of four ad characteristics in agent 320 has the same format but in other embodiments the formats can vary among characteristic definitions. Thus, each of Ads 1, 2, 3 and 4 have their own Active Indicator, Ad Type, Color Field and Position Field. The position of each ad characteristic definition within the agent determines the slot to which the associated ad is assigned. The characteristic definitions are mapped to the page layout by parsing the agent left-to-right while parsing the page in a left-to-right and top-down manner. Any other approach to assigning agent definitions to a page layout is possible. Note that in other embodiments it may not be necessary to have a spatial assignment of ad characteristics with ad slots. So in FIG. 3, Ad 1 is in the first position of the agent and is assigned to slot 330, Ad 2 is in the second position of the agent and is assigned to slot 332, Ad 3 is in the third position of the agent and is assigned to slot 334 and Ad 4 is in the fourth position of the agent and is assigned to slot 336. Each Ad is displayed according to its characteristic in the agent. Thus, agent 320 determines the display of ads for a particular layout in a web page.

Figure 4:
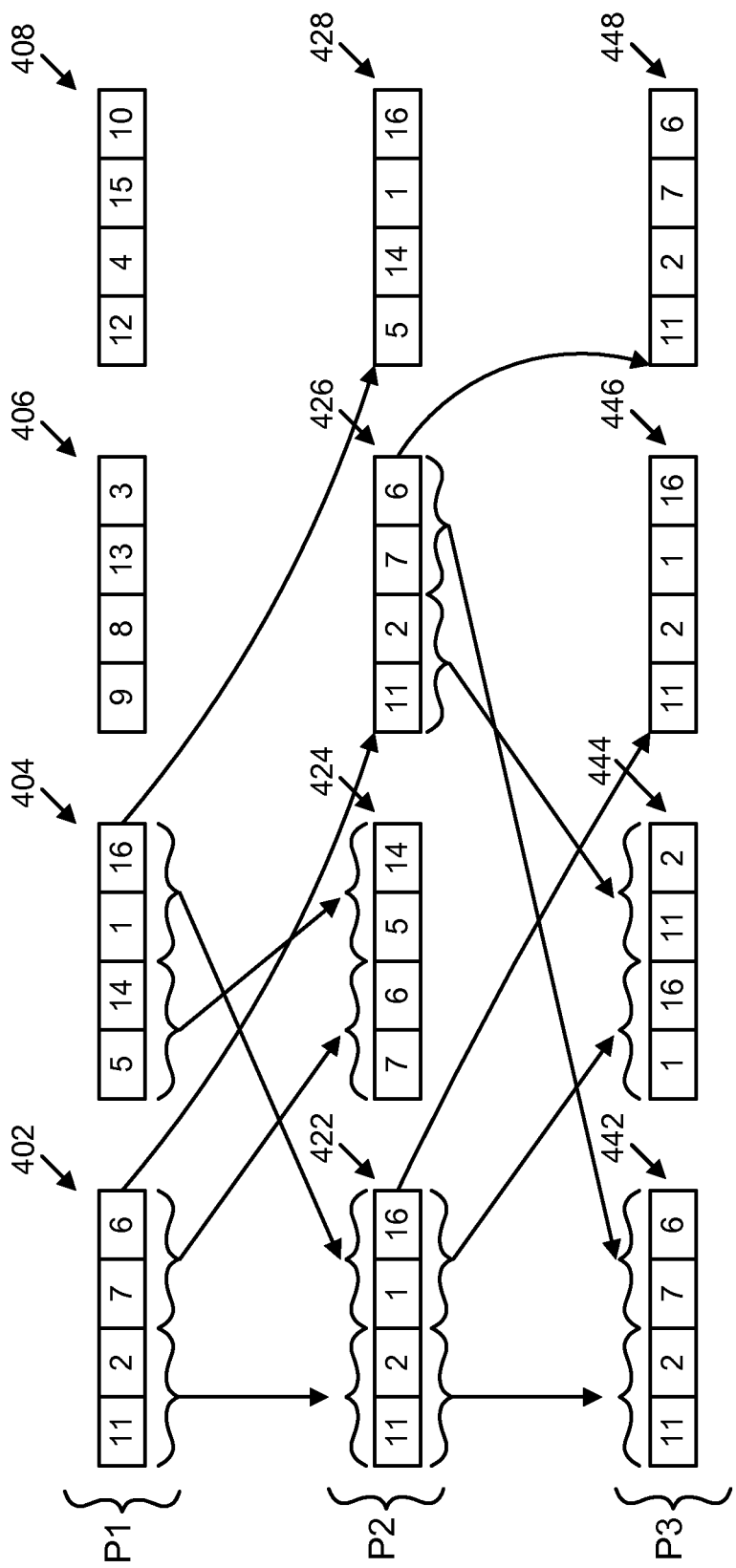
FIG. 4 illustrates a genetic computational procedure example of optimization of slot positions.

FIG. 4 illustrates a genetic computational procedure example of optimization of slot positions which can result in improved ad performance. In FIG. 4, Population 1 is designated as P1. It includes four agents 402, 404, 406, and 408. Only ad numbers are shown to represent a set of the respective ad's characteristic definitions. For example, In agent 402, Ad 11 is in position 1. All of Ad 11's characteristics are assumed to be represented by bits in the position for ad 11 within agent 402. Similarly Ads 2, 7 and 6 in the subsequent positions for agent 402 each have the same characteristic fields as do other ads in other agents of P1, such as agents 404, 406 and 408.

For ease of discussion P1 is shown with only 4 agents. In practice the number of agents can vary and is dependent upon the number of different layout possibilities that are desired to be maintained for a page, group of pages, website or other collection of web pages. Agent 404 includes Ads 5, 14, 1 and 16. Agent 406 includes Ads 9, 8, 13 and 3. Agent 408 includes Ads 12, 4 15 and 10. As described above, the position of each ad's set of characteristics within an agent determines the ad slot within a page layout where the ad associated with the characteristic set will be displayed. For example, if a page layout for web page 100 is performed using agent 402 then Ad 11 will be in slot 20, Ad 2 will be in slot 22, Ad 7 will be in slot 24 and Ad 6 will be in slot 26. Other types of operators can be used, including but not limited to crossover, double-crossover, mutation, inversion or directed manipulation of the characteristics based on domain knowledge. Any suitable present or future-discovered operators or techniques can be employed to generate successive agents, genomes, populations or other forms of characteristic descriptions for ad layouts.

In a preferred embodiment, the first population P1 is generated with random ads in random agents positions. Although each ad is different (they each have a different ad number or identifier) it is possible to have duplicate ads among a population and even within an agent, as desired. Performance statistics are obtained for each layout. Performance can be measured over a short time interval such as minutes or seconds (or less). Or performance can be measured over longer periods of time depending upon the amount of page "hits" (i.e., web traffic for a particular page), the amount of revenue being generated, the number of agents in a population, or depending upon other factors.

In order to generate a second population, P2, layouts that are performing better than other layouts in P1 are used to derive new agents according to rules. One rule for slot assignment takes Ad identifiers from better-performing agents and combines them to form new agents.

In FIG. 4, it is assumed that the measured performance of agent 402 and agent 404 is better than that of agents 406 and 408. One rule for generating new agents uses the first two ads from a first agent with the last two ads from a second agent. In the example, Ads 11 and 2 from agent 402 are combined with Ads 1 and 16 from agent 404 to produce new agent 422 in a second generation, or second population, P2. Similarly, Ads 7 and 6 from agent 402 are combined with Ads 5 and 14 from agent 404 to create new agent 424. Since agents 402 and 404 performed better than other agents, they are also propagated to P2. Thus, P2 includes agents 422 and 424 derived from agents 402 and 404; and P2 also includes agents 402 and 404 themselves, shown relabeled as agents 426 and 428 respectively.

Similarly, a third population, P3, can be generated by a similar approach. In P2 it is assumed that agents 422 and 426 are the better performing agents. So agent 442 of P3 is derived from Ads 11 and 2 of agent 422 and Ads 7 and 6 of agent 426, and agent 444 is derived from Ads 1 and 16 of agent 422 and Ads 11 and 2 of Agent 426. Agents 422 and 426 are also propagated to P3, shown relabeled as agents 446 and 448 respectively. In this manner subsequent generations of agents can have a higher percentage of better performing layouts to provide better ad performance.

A preferred embodiment also varies specific ad characteristics among subsequent population sets by allowing new agents to have individual characteristics or portions of characteristics from a prior generation of agents. For example, rather than inheriting an entire ad's characteristic set (e.g., Active Indicator, Ad Type, Color and Position) one or more of the characteristics or a portion of a characteristic can be used. Referring to FIG. 3, agent 300 may be divided so that, for example, the first half 340 of the characteristic set up to position 342 is used for a new agent while the second half of the new agent is obtained from a different agent. In this manner, the new agent includes the Active Indicator and Ad Type characteristics from agent 300 and also a portion of the color information from agent 300, while also including a remainder of the color information from a different agent and the Position Field from a different agent. By allowing splitting and inheritance of the data representation of specific characteristics and characteristic sets the optimization of a layout or individual ad placement can be performed at a characteristic-based level rather than a slot-based level as described in the discussion above in connection with FIG. 3.

Thus, a next generation of layout agents can allow inheritance of characteristics of better-performing layouts from the prior generation. Characteristics such as a fine degree of ad placement within a slot, numerous color changes, etc. can be varied among populations until each characteristic set can be optimized. A preferred embodiment uses a "gray code" representation of the characteristic values, but in other embodiments any suitable data format can be used.

FIG. 5 shows flowchart 500 that illustrates basic steps in a method according to an embodiment of the invention. Flowchart 500 is entered at 502 when it is desired to begin to present and optimize a display including ads.

At step 504 first ad characteristics are generated for the display of ad content. Next, step 506 is executed to use the ad characteristics generated in step 504 in an initial display of ad content with main content. Step 508 is executed to measure an impact of the ad content upon a human user. Step 510 is then executed to generate second characteristics derived at least in part from the first characteristics and the indicated impact.

Execution then loops back to step 506 where the new characteristics are used to generate new displays of ads and main content. Steps 506, 508 and 510 are repeated, as desired, to optimize a display of ads.

Note that the flowchart of FIG. 5 is but one illustrative example of a sequence of basic steps to achieve functionality according to an embodiment of the invention. Many variations can be made to the steps of FIG. 5 including adding, removing or modifying steps or step execution.

Although the invention has been described with respect to particular embodiments thereof, these particular embodiments are merely illustrative, and not restrictive. For example, although embodiments have been described as implemented with genetic computational procedure techniques, any other suitable programming approaches, techniques or methods can be used. For example, procedural, heuristic or a combination of both methods may be used, as desired. Other factors can be taken into consideration and used in a performance evaluation or to generate subsequent agent populations. For example, layout optimization can be associated with a time of day, day of the year (e.g., holidays, special events), geographic are, web site, source of a user being referred to a site, etc. This can allow a Valentine's day layout to be optimized differently from the same site or page on a different day of the year. Or if a user is referred to a target page being optimized from a search engine, the optimization can be handled differently than if the user is referred from another page at the target page's site. Many such variations are possible.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

The invention claimed is:

1. A method comprising:
    generating a first plurality of agents, wherein each agent includes a set of ad characteristic definitions ordered in a linear array, wherein each ad characteristic definition includes a set of ad characteristics ordered in a linear array, that define how an ad associated with the respective ad characteristic definition is displayed, and wherein a position of each ad characteristic definition along a linear array of a respective agent determines a respective ad slot within a page layout;
    sending display information to a user device to display the ad content according to the first plurality of agents;
    accepting a user input signal associated with the user device to indicate an impact of the ad content upon a human user for each agent of the first plurality;
    generating a second plurality of agents, wherein each agent of the second plurality of agents includes a set of ad characteristic definitions ordered in a linear array, wherein each ad characteristic definition includes a set of ad characteristics ordered in a linear array, that define how an ad associated with the respective ad characteristic definition is displayed, and wherein each agent of the second plurality of agents is derived at least in part from better-performing agents of the first plurality according to the impact of each agent of the first plurality;
    determining that a first agent and a second agent are better-performing than at least one other agent, wherein the first agent includes a set of first ad characteristic definitions ordered in a linear array, and wherein the second agent includes a set of second ad characteristic definitions ordered in a linear array;
    using a first portion of the first agent and a second portion of the second agent to create a third agent, wherein the first portion includes one or more ad characteristic definitions of the first agent, wherein the second portion includes one or more ad characteristic definitions of the second agent, and wherein the third agent includes a combination of ad characteristic definitions from the first and second portions; and
    sending display information to the user device to display the ad content according to the third agent.

2. The method of claim 1, wherein the user device includes a web browser for displaying a web page, and wherein each agent determines the display of ads for a particular page layout.

3. The method of claim 1, wherein a user input signal associated with the user device includes a user selection of the ad content.

4. The method of claim 1, wherein a user input signal associated with the user device includes a time duration of display of the ad content on a display screen associated with the user device.

5. The method of claim 1, further comprising using genetic computing techniques to achieve one of more of the actions recited in claim 1.

6. The method of claim 1, wherein the ad characteristic definitions of a particular agent are different from each other.

7. The method of claim 6, wherein a portion of an agent includes a complete characteristic set for an ad.

8. The method of claim 6, wherein a portion of an agent includes one or more characteristics in a characteristic set associated with an ad.

9. The method of claim 8, wherein a characteristic set includes ad position.

10. The method of claim 8, wherein a characteristic set includes enabling of an ad.

11. The method of claim 8, wherein a characteristic set includes a pointer to ad content.

12. The method of claim 8, wherein a characteristic set includes ad color.

13. The method of claim 8, wherein a characteristic set includes images within an ad.

14. The method of claim 9, wherein ad position includes a position within a slot on a web page.

15. An apparatus comprising:
   a processor;
   one or more instructions executable by the processor for:
   generating a first plurality of agents, wherein each agent includes a set of ad characteristic definitions ordered in a linear array, wherein each ad characteristic definition includes a set of ad characteristics ordered in a linear array, that define how an ad associated with the respective ad characteristic definition is displayed, and wherein a position of each ad characteristic definition along a linear array of a respective agent determines a respective ad slot within a page layout;
   sending display information to a user device to display the ad content with main content according to the first plurality of agents;
   accepting a user input signal associated with the user device to indicate an impact of the ad content upon a human user for each agent of the first plurality;
   generating a second plurality of agents, wherein each agent of the second plurality of agents includes a set of ad characteristic definitions ordered in a linear array, wherein each ad characteristic definition includes a set of ad characteristics ordered in a linear array, that define how an ad associated with the respective ad characteristic definition is displayed, and wherein each agent of the second plurality of agents is derived at least in part from the better-performing agents of the first plurality according to the impact of each agent of the first plurality;
   determining that a first agent and a second agent are better-performing than at least one other agent, wherein the first agent includes a set of first ad characteristic definitions ordered in a linear array, and wherein the second agent includes a set of second ad characteristic definitions ordered in a linear array;
   using a first portion of the first agent and a second portion of the second agent to create a third agent, wherein the first portion includes one or more ad characteristic definitions of the first agent, wherein the second portion includes one or more ad characteristic definitions of the second agent, and wherein the third agent includes a combination of ad characteristic definitions from the first and second portions; and
   sending display information to the user device to display the ad content with the main content according to the third agent.

16. A non-transitory machine-readable storage medium including instructions for:
   generating a first plurality of agents, wherein each agent includes a set of ad characteristic definitions ordered in a linear array, wherein each ad characteristic definition includes a set of ad characteristics ordered in a linear array, that define how an ad associated with the respective ad characteristic definition is displayed, and wherein a position of each ad characteristic definition along a linear array of a respective agent determines a respective ad slot within a page layout;
   and wherein a position of each ad characteristic definition within a respective agent corresponds to a respective ad slot within a page layout;
   sending display information to a user device to display the ad content with main content according to the first plurality of agents;
   accepting a user input signal associated with the user device to indicate an impact of the ad content upon a human user for each agent of the first plurality;
   generating a second plurality of agents, wherein each agent of the second plurality of agents includes a set of ad characteristic definitions ordered in a linear array, wherein each ad characteristic definition includes a set of ad characteristics ordered in a linear array, that define how an ad associated with the respective ad characteristic definition is displayed, and wherein each agent of the second plurality of agents is derived at least in part from the better-performing agents of the first plurality according to the impact of each agent of the first plurality;
   determining that a first agent and a second agent are better-performing than at least one other agent, wherein the first agent includes a set of first ad characteristic definitions ordered in a linear array, and wherein the second agent includes a set of second ad characteristic definitions ordered in a linear array;
   using a first portion of the first agent and a second portion of the second agent to create a third agent, wherein the first portion includes one or more ad characteristic definitions of the first agent, wherein the second portion includes one or more ad characteristic definitions of the second agent, and wherein the third agent includes a combination of ad characteristic definitions from the first and second portions; and
   sending display information to the user device to display the ad content with the main content according to the third agent.

* * * * *